Patented Apr. 14, 1936

2,037,010

UNITED STATES PATENT OFFICE 2,037,010

CELLULOSE DERIVATIVE COMPOSITION

Henry Dreyfus, London, England

No Drawing. Application July 1, 1932, Serial No. 620,545. In Great Britain July 30, 1931

7 Claims. (Cl. 106—40)

This invention relates to the manufacture or treatment of products or articles made of or containing cellulose derivatives.

The invention is based on the discovery that certain cyclic compounds have a solvent or softening action upon cellulose derivatives and may be applied very widely in the arts in processes and products in which a solvent or softening action upon cellulose derivatives is desired. The cyclic compounds of the present invention are compounds containing a ring which consists of a keto group, an ether oxygen atom and four methylene groups in which one or both of the hydrogen atoms may or may not be replaced by substituents. These compounds will for convenience be termed "oxanones". The simplest compound of the series is tetrahydropyrone

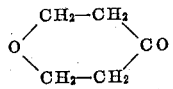

which will be hereinafter termed "1.4-oxanone". This compound with its substitution derivatives constitute the most important solvents and softening agents of the present invention.

As previously indicated the invention contemplates quite broadly processes and products utilizing the solvent or softening (including plasticizing) properties of these compounds for cellulose derivatives. 1.4-oxanone possesses very high solvent power for acetone-soluble cellulose acetate and for other esters and ethers of cellulose including nitro cellulose. Substitution of the hydrogen atoms of the methylene groups in 1.4-oxanone tends to decrease somewhat the solvent power of the product except where the substituent groups themselves confer solvent or softening properties. Thus, for instance, alkylated, aralkylated or arylated 1.4-oxanones have in general less solvent power for acetone-soluble cellulose acetate than has the parent 1.4-oxanone. On the other hand 1.4-oxanone substituted in the methylene groups by polar groups, for instance carboxylic ester groups, has again high solvent power for cellulose acetate.

A very important aspect of the present invention consists in employing the oxanones as solvents, softeners or plasticizing agents in dopes, varnishes, lacquers or the like containing nitrocellulose, cellulose acetate or other esters or ethers of cellulose, and in solutions for the manufacture of artificial filaments, ribbons, films, foils, sheets, and the like by dry or wet spinning processes. In such applications the compounds of the present invention are particularly important as medium or high boiling solvents or plasticizers, and in order to employ the compositions containing the oxanones and the cellulose derivatives as lacquers, varnishes, spinning solutions and the like, it is desirable to employ the oxanones in conjunction with other solvents and/or diluents, for example acetone, methyl acetone, methyl acetate, methyl formate, ethyl acetate, the ethers and esters and ether-esters of olefine and polyolefine glycols for instance the mono-methyl and ethyl ethers of ethylene and propylene glycol and ethylene glycol monoacetate and methyl glycol mono-acetate, methylene chloride, ethylene chloride, dichlorethylene, trichlorethylene, chloroform, methyl, ethyl or other alcohols, hydrocarbons and ethers, for instance iso-propyl ether. Where very high volatility is desired acetaldehyde or other very low boiling solvents may be used. In the manufacture of dopes, lacquers and the like the oxanones of the present invention may constitute the high boiling solvents or plasticizers, in which case the dope or lacquer will usually include low and medium boiling solvents, for example those mentioned above, and may include 1.4-diluents, or the dope or lacquer may include 1.4-oxanone and 1.4-oxanone substituted by groups which do not substantially decrease its volatility as medium boiling solvents, and in such a dope or lacquer low boiling solvents, such as those mentioned above, may be included together with relatively high boiling solvents or plasticizers which may themselves be oxanones, as for example 2.6-dimethyl-1.4-oxanone-3.5-dicarboxylic acid di-butyl or di-iso-amyl ester, or may be other high boiling solvents or plasticizers, for example triacetin, diethyl phthalate, dibutyl phthalate, sulphonamides, for example alkylated xylene sulphonamides, sulphonanilides, tartrates, for instance dibutyl or di-iso-amyl tartrate, or diphenylol propane, triphenyl phosphate, tricresyl phosphate (the latter two preferably in conjunction with sulphonamides, tartrates or other highly compatible plasticizers), or other phenolic plasticizers. Other medium boiling solvents which may be used together with the lower boiling oxanones used as medium boilers in dopes, lacquers and the like or together with high boiling ozanone plasticizers include ethyl lactate, diacetone alcohol and tetrachlorethane. Diluents, for example toluene, xylene or other relatively cheap hydrocarbons or other non-solvents for the cellulose derivatives, may be incorporated in the dopes, varnishes, lacquers, spinning solutions or the like within the range of tolerance of such solutions. It is found that 1.4-oxanone has quite a high degree of tolerance for these hydrocarbons. The dopes, varnishes, lacquers, film-forming compositions, spinning solutions and the like may contain any other desired constituents, for example dyestuffs, pigments (colored or white), or resins, for instance dammar, shellac, fusible soluble phenol-aldehyde resins including the diphenylol propane formaldehyde type of synthetic resin, ketone phenol resins, polyvinyl resins, urea or thiourea-formaldehyde resins, sulphonamide aldehyde resins, and the resins obtained from glycerine and other polyhydric alcohols and phthalic acid and other poly-basic acids. The compositions may further include the substances adapted to reduce flammability, for example halogenated and especially brominated organic compounds, for instance brominated acidylated aromatic amines, e. g. tribrom-acetanilide. As with the tribrom-acetanilides the non-inflammators may themselves be plasticizers and in fact to be the sole plasticizers, or other plasticizers may be present in addition, such as those mentioned above. Halogenated and especially brominated oxanones, for example 2.6-diphenyl-2.5-dimethyl-3.5-dibrom-1.4-oxanone, may be used as the non-inflammator with or without other plasticizers, this constituting a further important application of the present invention.

In the manufacture of artificial filaments, ribbons, films and the like by employing oxanones as solvents or softening agents for the present invention, the oxanone will in general not be the sole solvent present in the spinning solution. Thus, for instance, in dry spinning operations acetone or mixtures of acetone with alcohol, methylene chloride or ethylene chloride and alcohol may be included in the solutions, and it is desirable that the oxanone should constitute a relatively small proportion of the total solvent present on account of its relatively high boiling point. It may be present, for example, in a proportion up to about 50% on the weight of the cellulose acetate or other cellulose derivative. In wet spinning operations the high boiling points of the oxanones are relatively immaterial so that they can constitute the sole solvent present in the spinning solution. However, even here it is desirable to employ acetone and like solvents in addition to the oxanones. The invention further includes in wet spinning operations the incorporation of the oxanone in the coagulating bath whether or not it is present in the spinning solution. Such processes are described in U. S. Patent No. 1,467,493 and U. S. applications S. Nos. 402,785 filed 26th October, 1929 and 418,414 filed 3rd January, 1930. Furthermore after a wet spinning operation in which an oxanone is included in the spinning solution or in the coagulating bath or in which no oxanone is used at all the filaments or other products may be treated in subsequent treatment baths containing oxanones. Such processes are also described in U. S. application S. No. 402,785.

In the manufacture of plastics and moulding powders the oxanones are especially useful as plasticizing agents, and for this purpose the less volatile substituted oxanones are of importance and especially oxanone carboxylic esters and their alkyl and aryl derivatives, for example alkylated oxanone dicarboxylic acid esters. The oxanone plasticizer may be incorporated in the cellulose derivative by any of the usual methods adopted in the celluloid art. For instance the plasticizer may be dissolved in a suitable liquid which may be a non-solvent or a solvent for the cellulose derivative and the solution may be sprayed or otherwise incorporated with the cellulose derivative and the mass worked on rolls in the customary manner. A mixture of benzene and alcohol is a particularly useful mixture for dissolving the plasticizing agents of the invention and for incorporating them in the cellulose derivatives. Alcohol itself may be used similarly or other liquids which are solvents for the oxanones and are non-solvents or have a relatively low solvent or softening action upon the cellulose derivative.

In addition to being of value in the working up of cellulose esters and ethers into any desired products as described above the solvents, softening agents or plasticizers of the present invention are also highly valuable for the treatment of already formed articles made of or containing cellulose derivatives, for example filaments, yarns, threads, ribbons, films, fabrics and the like. Such treatments may have various objects. For example the tendency of woven fabrics to slip or of warp or circular knitted fabrics to split or ladder may be diminished or eliminated by treatment with the oxanones of the present invention in the manner described in U. S. application S. No. 152,516 filed 3rd December, 1926. The solvents may be used to improve the pliability or extension of filaments, threads and the like made of or containing cellulose derivatives, and in particular to improve the knotting properties of comparatively thick filaments or artificial horsehair. Such treatment with the oxanones is preferably effected without tension or only under a light tension so that the materials are able to shrink. Shrinking of the filaments, yarns and the like either to improve their extension or their pliability is particularly important in relation to the treatment of filaments or the like of low extension produced by wet spinning processes, or filaments or the like of low extension produced by the stretching of dry-spun products. Such shrinking processes are described broadly in U. S. application S. No. 611,240 filed 13th May, 1932.

The oxanones may further be employed for the purpose of improving the tenacity of filaments or other products of cellulose acetate or other cellulose derivatives. In such an application the filaments or other products during or subsequent to softening with the oxanones or mixtures containing the same are subjected to a stretching treatment. The softening of the filaments or other products may be effected by treatment with the oxanones or solutions thereof, or the oxanones may be incorporated in the materials by incorporating them in the spinning solution and spinning under such conditions that the proportion of oxanone requisite to produce the desired degree of softening is retained in the filaments. Thus the required proportion may be incorporated in the spinning solution and the latter spun by dry spinning methods. The stretching treatment of the softened filaments or other products may be applied in a single operation and preferably gradually, or may be applied in a number of stages, preferably without intermediate elimination of the solvent as described in U. S. application S. No. 402,785. From the point of view of producing regularity of stretch and also for reasons of economy it is particularly advantageous to stretch the filaments or other products while they are in warp formation by applying the stretching force to the warp as a whole. Such a process is described in U. S. application S. No. 602,844 filed 2nd April, 1932.

For the treatment of filaments, yarns and the like of cellulose derivatives, sizes may be made up containing the oxanones so as to effect a lubrication of the yarns or other materials, particularly for facilitating textile operations, such as winding, winding and twisting, beaming and the like. Such sizes may be made up with or without suitable thickening agents, such as polymerized vinyl compounds, or oxidized linseed oil or other drying oils.

The oxanones are also of considerable value in processes involving the absorption of various liquid or solid materials by filaments, yarns, threads, fabrics and the like containing the cellulose esters or ethers. For example such products may be treated with the oxanones during or before the treatment adapted to dye, print, discharge, load, mordant or apply delustering compounds to the materials, the absorption of the dyes, loading agents, mordanting agents, discharges, delustering compounds being facilitated or rendered possible by the aid of the solvents. Thus, for instance, a large number of solid agents have little or no affinity for cellulose acetate, and by means of the oxanones such substances may be incorporated in the materials by dyeing, printing, stencilling or mechanical impregnation methods. Examples of such substances include certain basic dyestuffs which have relatively little affinity especially in printing processes, the acid wool and direct cotton dyestuffs, certain vat dyestuffs, pigments (white or coloured), for example titanium oxide, and certain discharges, for example the formaldehyde sulphoxylate discharges. Furthermore in printing and similar operations, it is customary to apply a steaming or ageing treatment to fix the dyestuff or other agent in the material. By incorporating the oxanones in the printing pastes or similar compositions the materials may be simply dried under such conditions as to volatilize the oxanone in order to effect fixation without having recourse to steaming or ageing. 1.4-oxanone and its lower homologues are particularly useful for this purpose. Again in the treatment of yarns, fabrics, etc. the oxanones of the present invention may be utilized to reluster fabrics or other materials containing cellulose acetate or other esters or ethers of cellulose which have been delustered by the action of moist steam or of hot aqueous media, and reference is made in this connection to U. S. Patent No. 1,808,098. Such relustering may be uniformly applied over the whole fabric or material, or may be local so as to produce an effect fabric. The oxanone may for instance be printed with the aid of a suitable thickening agent on the delustered fabric and the whole dried to reluster the fabric in the printed portions. Dyestuffs, pigments, discharges or other effect materials may be included in the oxanone printing paste.

In the above applications of the oxanones of the present invention to already formed products made of or containing cellulose acetate or other cellulose esters or ethers, the oxanones may be employed as such, particularly where they are liquids and their solvent power has been reduced by suitable substituent groups, as for instance alkyl groups. Or where their solvent power is too great they may be mixed with suitable diluents, for example hydrocarbon diluents of the aliphatic, aromatic or cyclo-aromatic series, ethers, alcohols, water and the like. Furthermore the oxanones may of course be mixed with other solvents.

As previously mentioned 1.4-oxanone itself is a very important agent for use in accordance with the present invention. Other examples of oxanones include 2.6-dimethyl-1.4-oxanone; 1.4-oxanone-2.6-dicarboxylic acid diethyl ester; 2-dimethyl-1.4-oxanone-6-carboxylic acid ethyl ester; 2.6-dimethyl-1.4-oxanone-3.5-dicarboxylic acid diethyl ester; 2.6-dimethyl-1.4-oxanone-3.5-dicarboxylic acid dibutyl ester; 2.6-dimethyl-1.4-oxanone-3.5-dicarboxylic acid di-iso-amyl ester; 3.5-dibenzal-1.4-oxanone; 2.6-diphenyl-3.5-dimethyl-1.4-oxanone; 2.6-diphenyl-3.5-dimethyl-3.5-dibrom-1.4-oxanone. Furthermore the invention includes compounds in which one or more substituents of the parent oxanone themselves form a further ring. Examples of such substances are:—

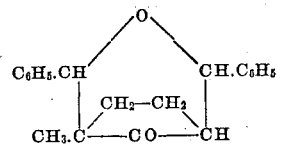

and

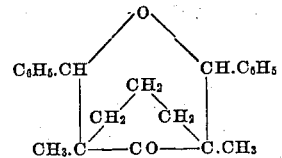

The invention is particularly important in relation to the manufacture of artificial silk, ribbons, films, dopes, lacquers, plastics, moulding powders and the like, and the treatment of filaments, fabrics and other formed products of cellulose acetate, but it may also be applied to the manufacture and treatment of similar products of cellulose nitrate and also of cellulose formate, cellulose propionate, cellulose butylate, cellulose nitro-acetate (of low nitrogen content) and other organic esters of cellulose or mixed esters, and also ethyl or benzyl celluloses or other cellulose ethers or mixed ethers or mixed ether-esters.

The following examples illustrate the invention, but it will be appreciated that the proportions of reagents used in these examples are not intended in any way to limit the invention nor is the invention limited to the applications of the solvent, softening or plasticizing properties of oxanones given in these examples.

*Example 1*

A plastic mass of cellulose acetate and an oxanone plasticizer may be made up by any of the customary methods used in the art. For example 30-35 parts of 2.6-dimethyl-1.4-oxanone-3.5-dicarboxylic acid dibutyl or di-iso-amyl ester are dissolved in 100 parts of a mixture of benzene and alcohol in the proportions of about 50 parts of each. The solution is sprayed or otherwise incorporated with about 100 parts of acetone-soluble cellulose acetate and the incorporation is carried out as is usual on malaxating rollers, the benzene-alcohol being evaporated or allowed to evaporate during the malaxation or afterwards to obtain the plasticized mass which may then be moulded into sheets, rods, blocks or other articles which may be seasoned as usual.

*Example 2*

The following example illustrates a composition which may be used as a lacquer for coating articles of any kind and it may also be used to provide insulation for electrical conductors:—

| | Parts |
|---|---|
| Cellulose acetate | 50 |
| Polymerized vinyl acetate | 50 |
| 2.6 - dimethyl - 1.4 - oxanone-3.5-dicarboxylic acid dibutyl or di-iso-amyl ester | 35 |
| Acetone | 500 |
| Alcohol | 250 |
| Benzene | 250 |

*Example 3*

A composition is prepared as follows:—

| | Parts |
|---|---|
| Cellulose acetate | 100 |
| Diphenylol propane formaldehyde synthetic resin | 20 |
| Tricresyl phosphate | 15 |
| Diphenylol propane | 20 |
| Acetone | 500 |
| 1.4-oxanone | 300 | and may be utilized for the same purposes as the composition in the preceding example.

*Example 4*

A further lacquer composition may be made up as follows:—

| | Parts |
|---|---|
| Nitro cellulose | 100 |
| Diphenylol propane formaldehyde resin | 20 |
| 2.6-dimethyl-1.4 - oxanone-3.5 dicarboxylic acid dibutyl or di-iso-amyl ester | 20 |
| Triphenyl phosphate | 20 |
| Acetone | 100 |
| Butyl acetate | 900 |

*Example 5*

The following example illustrates a lacquer composition capable of producing a highly flexible film or coating particularly suitable for covering rubber insulated cables and the like:—

| | Parts |
|---|---|
| Cellulose acetate | 100 |
| Diphenylol propane formaldehyde resin | 30 |
| Dibutyl tartrate | 200 |
| Tricresyl phosphate | 15 |
| Acetone | 500 |
| Dioxane | 100 |
| 1.4-oxanone | 50 |

*Example 6*

A composition prepared from

| | Parts |
|---|---|
| Cellulose acetate | 100 |
| Acetone | 300 |
| 1.4-oxanone | 30–40 | is spun by ordinary dry spinning methods into filaments. The filaments owing to their content of oxanone may be drawn out to very fine deniers, and in order to assist this operation the filaments before complete drying may be carried round light rollers, glass rods or the like in order to provide a resistance beyond which a further stretch may be applied.

*Example 7*

A 25% solution of cellulose acetate in acetone is extruded through spinning nozzles into a coagulating bath consisting of a 30–40% aqueous, alcoholic, or aqueous-alcoholic solution of 1.4-oxanone. The soft filaments after emergence from the coagulating bath are carried through a guide to a rotating roller having a peripheral speed of 50–70 metres per minute. The filaments may be drawn down to very fine deniers. After leaving the feed roller the excess oxanone is removed, as for example by washing it with a more dilute solution of oxanone, for instance a 10–15% solution, and the filaments are finally dried. In this example the spinning solution may contain 10% on the weight of the cellulose acetate of 1.4-oxanone.

*Example 8*

Filaments or yarns of cellulose acetate in hank or other suitable form are soaked for about 2 minutes in a bath consisting of 30–40% aqueous, alcoholic, or aqueous-alcoholic solution of 1.4-oxanone and are thereafter stretched to the desired degree, for example by more than 100% of their original length. The stretching is preferably carried out slowly, and by providing a bath of suitable length to enable the softening to take place the stretching may be applied to travelling filaments, for example filaments in warp formation.

*Example 9*

A fabric consisting of cellulose acetate yarns and either delustered or of a normal lustre is printed with the following printing paste:—

| | Grams |
|---|---|
| Dyestuff or pigment | 10– 35 |
| Diethylene glycol | 60– 75 |
| Water | 160 |
| 1.4-oxanone | 200–500 |
| Gum arabic (1:1) | 400–600 |

The dyestuff or pigment may be a typical cellulose acetate dyestuff, as for example a dyestuff of the amino anthraquinone series, or a nitro-diarylamine, or may be an acid wool or direct cotton dyestuff, or a pigment may be used, such as titanium oxide. After printing the fabric is dried at a temperature of 85–95° C. for a sufficient time to cause the oxanone to evaporate and is then washed with warm water, soaped for a few minutes at 50° C. in a solution containing 2½ grams of soap per litre and finally rinsed. Where a delustered fabric has been used and the printing paste includes a dyestuff, the lustre of the printed areas is restored.

What I claim and desire to secure by Letters Patent is:—

1. Compositions of matter comprising derivatives of cellulose and oxanones.
2. Compositions of matter comprising organic derivatives of cellulose and oxanones.
3. Compositions of matter comprising cellulose acetate and an oxanone.
4. Compositions of matter comprising organic derivatives of cellulose and 1,4-oxanones.
5. Compositions of matter comprising cellulose acetate and 1,4-oxanone.
6. Compositions of matter comprising organic derivatives of cellulose and 1,4-oxanone carboxylic esters.
7. Compositions of matter comprising cellulose acetate and a 1,4-oxanone carboxylic ester.

HENRY DREYFUS.